United States Patent
Dass

(10) Patent No.: US 7,309,163 B2
(45) Date of Patent: Dec. 18, 2007

(54) THRUST BEARING ASSEMBLY WITH A STACK OF THRUST BEARING MEMBERS

(76) Inventor: Pradeep Dass, 820 Reid Pl., Edmonton, Alberta (CA) T6R 2M4

( * ) Notice: Subject to any disclaimer, the term of this patent is extended or adjusted under 35 U.S.C. 154(b) by 39 days.

(21) Appl. No.: 10/543,225

(22) PCT Filed: Jan. 22, 2004

(86) PCT No.: PCT/CA2004/000081

§ 371 (c)(1),
(2), (4) Date: Jul. 22, 2005

(87) PCT Pub. No.: WO2004/065805

PCT Pub. Date: Aug. 5, 2004

(65) Prior Publication Data

US 2006/0104557 A1    May 18, 2006

(30) Foreign Application Priority Data

Jan. 22, 2003    (CA) .................................. 2417038

(51) Int. Cl.
*F16C 17/04* (2006.01)
*F16C 17/26* (2006.01)
(52) U.S. Cl. .................... 384/97; 384/304; 384/424
(58) Field of Classification Search ........ 384/304–308, 384/420, 424, 97, 92
See application file for complete search history.

(56) References Cited

U.S. PATENT DOCUMENTS

| 1,121,083 | A |   | 12/1914 | De Ferranti |
| 3,656,823 | A |   | 4/1972 | Tiraspolsky et al. |
| 3,858,668 | A | * | 1/1975 | Bell .......................... 384/424 |
| 4,856,914 | A | * | 8/1989 | Sigg ........................... 384/304 |
| 4,889,195 | A |   | 12/1989 | Kruger et al. |
| 5,480,233 | A |   | 1/1996 | Cunningham |

* cited by examiner

*Primary Examiner*—Thomas R. Hannon
(74) *Attorney, Agent, or Firm*—Christensen O'Connor Johnson Kindness PLLC

(57) ABSTRACT

A thrust bearing configuration for rotary applications includes a shaft (12) having an external surface (14) and a housing (16) having an internal surface (18). The housing and the shaft are adapted for relative rotational movement. Inner bearing support members (22) extend radially outwardly from the external surface of the shaft in axially spaced relation. Outer bearing support members (26) extend radially inwardly from the internal surface of the housing. A bearing pad (24, 28) is disposed between each one of the inner bearing support members and an adjacent one of the outer bearing support members. With the described configuration an axial force exerted upon the shaft is transmitted from the shaft through each of the inner bearing support members and bearing pads to the outer bearing support members and the housing. This thrust bearing acts like a bearing stack. It is possible to stack any number of these bearing pads to withstand anticipated axial loads.

4 Claims, 3 Drawing Sheets

THRUST BEARING ASSEMBLY WITH A STACK OF THRUST BEARING MEMBERS

FIELD OF THE INVENTION

The present invention relates to a thrust bearing assembly for rotary applications and, in particular, in applications in which space is limited.

BACKGROUND OF THE INVENTION

In some rotary applications, the space available for thrust bearings is limited. An example of such a space limited application relates to electric submersible pumps positioned down oil wells to pump liquid to surface. With such pumps, the thrust bearings must be positioned in the annular space between the shaft and the housing.

SUMMARY OF THE INVENTION

What is required is a thrust bearing assembly for rotary applications which can fit in a relatively confined space.

According to the present invention there is provided a thrust bearing configuration for rotary applications includes a shaft having an external surface and a housing having an internal surface. The housing and the shaft are adapted for relative rotational movement. At least two inner bearing support members are fixedly secured to and extend radially outwardly from the external surface of the shaft in axially spaced relation. At least two outer bearing support members are fixedly secured to and extend radially inwardly from the internal surface of the housing. At least one bearing pad is disposed between each one of the inner bearing support members and an adjacent one of the outer bearing support members. With the described configuration an axial force exerted upon the shaft is transmitted from the shaft through each of the inner bearing support members and bearing pads to the outer bearing support members and the housing.

The thrust bearing, as described above, acts like a bearing stack. It is possible to stack any number of these bearing pads in order to withstand anticipated axial loads.

The bearing pads may be secured to either one of the inner bearing support members or to one of the outer bearing support members. It is preferred, however, that there be provided an inner bearing pad secured to each of the inner bearing support members and an outer bearing pad secured to each of the outer bearing support members. With this configuration the inner bearing pad bearing and the outer bearing pad bear against each other.

BRIEF DESCRIPTION OF THE DRAWINGS

These end other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
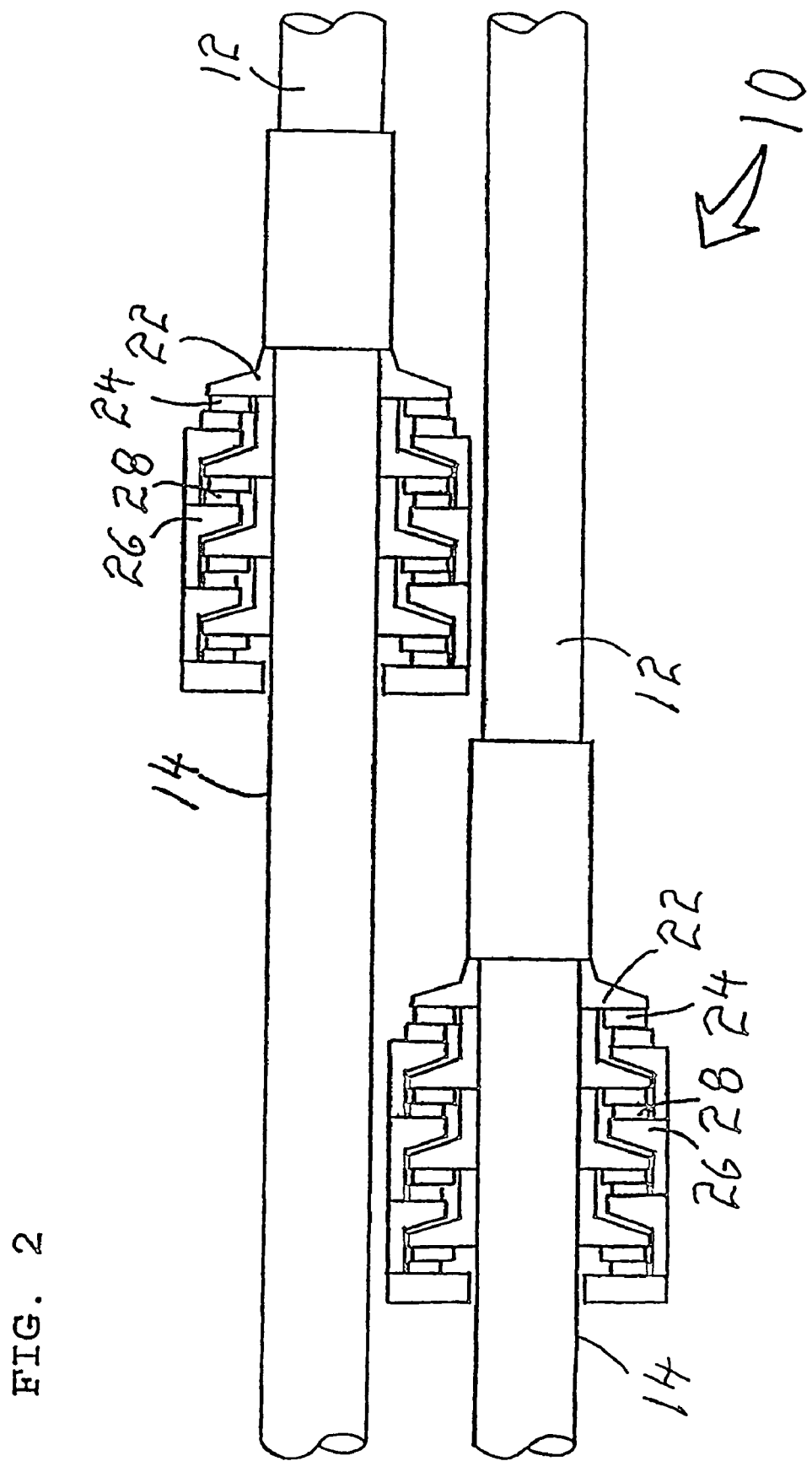
FIG. 2 is a side elevation view, in section, of two thrust bearing assemblies as illustrated in FIG. 1 stacked in close proximity as if in a confined space.
Figure 3:
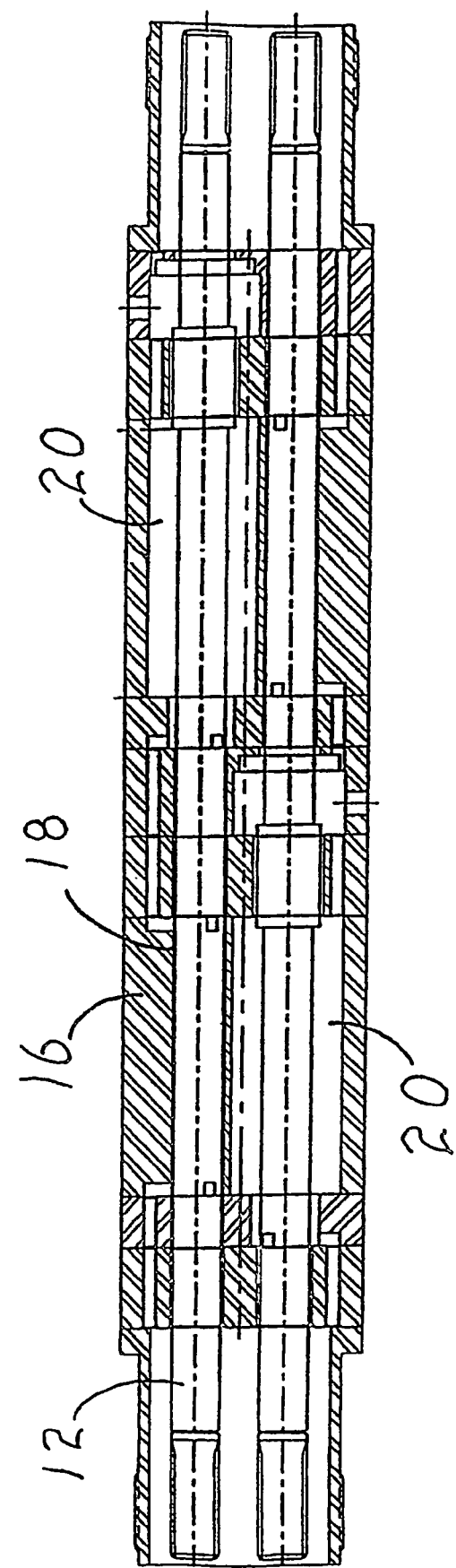
FIG. 3 is a side elevation view, in section, of a housing for two thrust bearing assemblies as illustrated in FIG. 2.

The preferred embodiment, a thrust bearing assembly for rotary applications generally identified by reference numeral 10, will now be described with reference to FIGS. 1 through 3.

Figure 1:
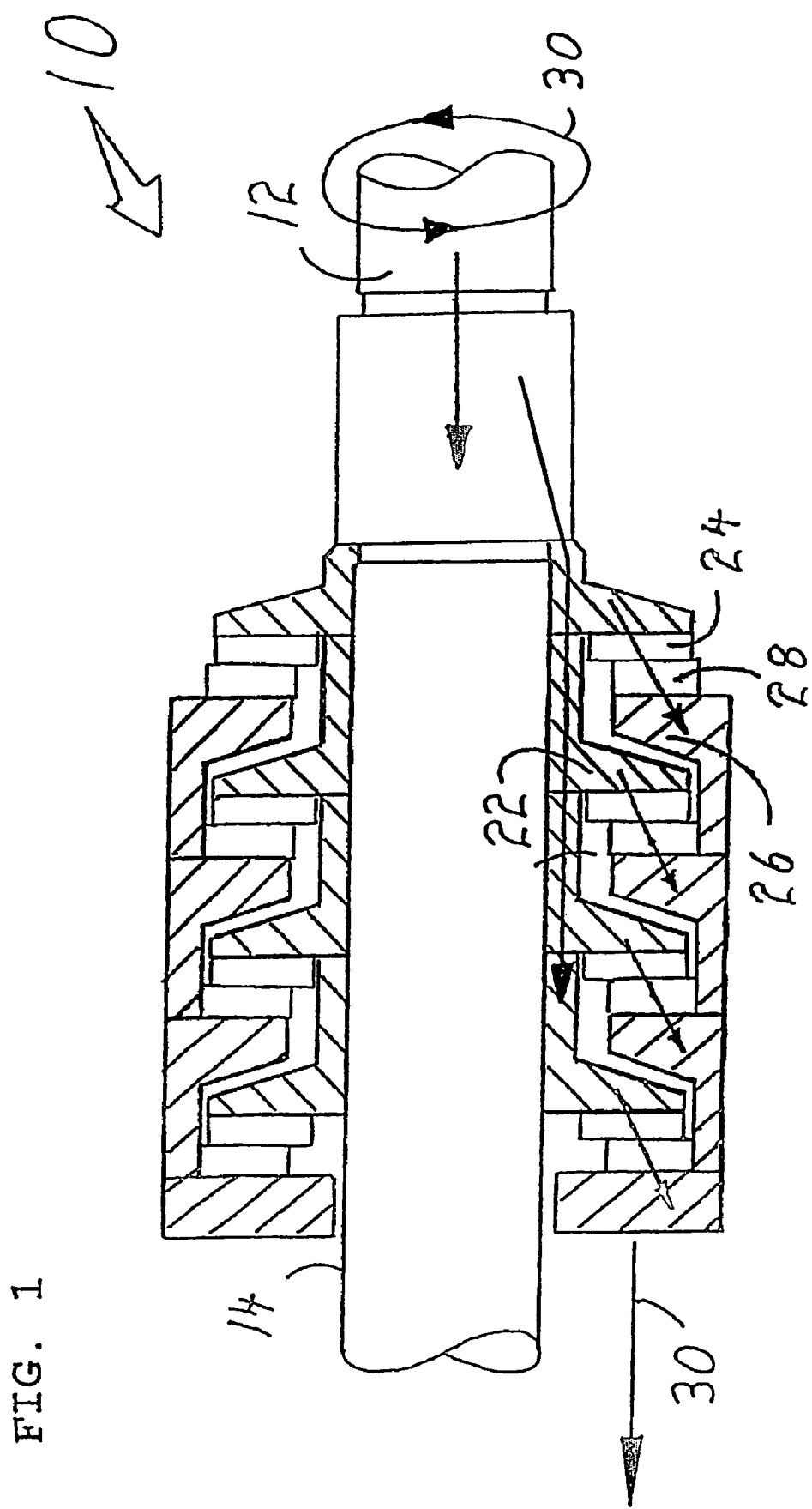
FIG. 1 is a side elevation view, in section, of a thrust bearing assembly for rotary applications constructed in accordance with the teachings of the present invention.

Structure and Relationship of Parts:

Referring to FIG. 1, thrust bearing assembly 10 includes a shaft 12 having an external surface 14. Referring to FIG. 3, a housing 16 has an internal surface 18. Shaft 12 and housing 16 are adapted for relative rotational movement. In the illustrated embodiment, housing 16 is adapted to receive two thrust bearing assemblies 10 as shown in FIG. 2 within two annular spaces 20 situate between shaft 12 and housing 16. Referring to FIG. 1, several inner bearing support members 22 are fixedly secured to and extend radially outwardly from external surface 14 of shaft 12. An inner bearing pad 24 is secured to each of inner bearing support members 22. Several outer bearing support members 26 are fixedly secured to and extend radially inwardly from internal surface 18 of housing 16. An outer bearing pad 28 is secured to each of outer bearing support members 26. Referring to FIGS. 1 through 3, each of outer bearing pad 28 bears against inner bearing pad 24 on each adjacent one of inner bearing support members 22, such that an axial force 30, exerted upon shaft 12, is transmitted from shaft 12 through each of inner bearing support members 22, inner bearing pads 24 and outer bearing pads 28 to outer bearing support members 26 and housing 16.

Operation:

The use and operation of thrust bearing assembly 10 will now be described with reference to FIGS. 1 through 3. Referring to FIG. 1, as axial force 30 is applied to shaft 12, thrust is transferred to plurality of inner bearing support members 22 and inner bearing pads 24. Each inner bearing pad 24 makes contact with each outer bearing pad 28 transferring axial force 30 to plurality of outer bearing support members 26. Referring to FIGS. 2 and 3, thrust bearing assemblies may be stacked in close proximity and housed within one housing.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A thrust bearing configuration for rotary applications, comprising:
    at least two parallel shafts, each shaft having an external surface;
    a housing having an internal surface, each shaft being mounted for axial rotation within the housing;
    at least two inner bearing support members fixedly secured to and extending radially outwardly from the external surface of each shaft in axially spaced relation;
    at least two outer bearing support members fixedly secured to and extending radially inwardly from the internal surface of the housing; and at least one bearing pad disposed between each one of the inner bearing support members and an adjacent one of the outer bearing support members, such that an axial force exerted upon each shaft is transmitted from each shaft through each of the inner bearing support members and bearing pads to both the inner bearing support members of another of the shafts and the outer bearing support members of the housing.

2. The thrust bearing as defined in claim 1, wherein each bearing pad is secured to one of the inner bearing support members or to one of the outer bearing support members.

3. The thrust bearing as defined in claim 1, wherein an inner bearing pad is secured to each of the inner bearing support members and an outer bearing pad is secured to each of the outer bearing support members with the inner bearing pad bearing against the outer bearing pad.

4. A thrust bearing configuration for rotary applications, comprising:
- at least two parallel shafts, each shaft having an external surface;
- a housing having an internal surface, each shaft being mounted for axial rotation within the housing;
- an annular space between each shaft and the housing;
- several inner bearing support members fixedly secured to and extending radially outwardly from the external surface of each shaft into the annular space in axially spaced relation;
- an inner bearing pad secured to each of the inner bearing support members;
- several outer bearing support members fixedly secured to and extending radially inwardly from the internal surface of the housing into the annular space in axially spaced relation;
- an outer bearing pad secured to each of the outer bearing support members and bearing against the inner bearing pad on an adjacent one of the inner bearing support members, such that an axial force exerted upon each shaft is transmitted from each shaft through each of the inner bearing support members, inner bearing pads and outer bearing pads to both the inner bearing support members of another of the shafts and the outer bearing support members of the housing thereby acting as a bearing stack within the annular space.

* * * * *